United States Patent Office 3,810,947
Patented May 14, 1974

3,810,947
ALKYLATION OF AROMATIC COMPOUNDS
Louis Schmerling, Riverside, Ill., assignor to Universal Oil Products Company, Des Plaines, Ill.
No Drawing. Filed Mar. 31, 1972, Ser. No. 240,278
Int. Cl. C07c 25/14
U.S. Cl. 260—651 R    9 Claims

ABSTRACT OF THE DISCLOSURE

Aromatic compounds may be alkylated with certain polychloro-substituted alkenes containing one tertiary carbon atom and at least one chlorine atom on a doubly-bonded carbon atom in the presence of a Friedel-Crafts catalyst to produce an alkylated aromatic compound in which the product contains a chlorinated substituent containing only primary and secondary carbon atoms in the chain.

SPECIFICATION

This invention relates to a process for the alkylation of aromatic compounds and more particularly to a process for obtaining alkylated aromatic compounds in which the side chain contains only primary or secondary carbon atoms. Substituted aromatic compounds in which the substituent is a straight chain radical (i.e., one containing no tertiary carbon atoms) will find a wide variety of uses in the chemical field. For example, a compound such as 1,1-dichloro-3-phenyl-1-pentene may be hydrolyzed to form the corresponding phenyl-substituted straight chain carboxylic acid. Likewise a compound such as 1-chloro-3-phenyl-1-pentene may be hydrolyzed to the corresponding aldehyde. These alcohols and aldehydes are useful in the chemical industry as an intermediate in the preparation of insecticides, flame-proofing products, or, if the straight chain alkyl substituent contains a sufficient number of carbon atoms, the product may be used as an intermediate in the preparation of detergents.

As is known in the prior art, when an aromatic compound is alkylated with an isoalkyl chloride such as, for example, isobutyl chloride, the alkylated product is a t-alkyl aromatic compound such as t-butylbenzene formed by alkylating benzene with the aforementioned isobutyl chloride. In contradistinction to this, it has now been discovered that the product which is obtained when alkylating an aromatic compound such as benzene with certain substituted isobutyl chlorides such as 1,1,4-trichloro-3-methyl-1-butene, the resulting product unexpectedly comprises aromatic compounds (1) and (2) containing straight-chain substituents rather than the expected compound (3) containing a tertiary substituent, the reaction being set forth below.

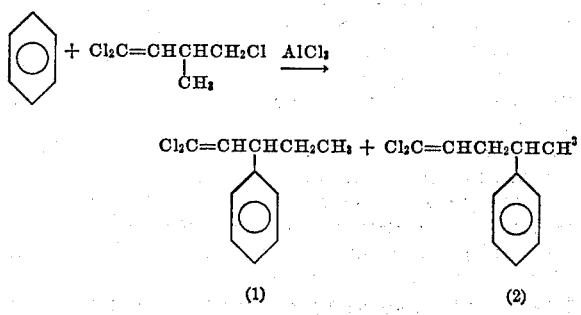

and not

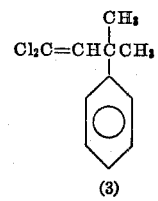

(3)

It is therefore an object of this invention to provide a process for the alkylation of aromatic compounds. It is realized that the term "alkylation" usually refers to introduction of a saturated (alkyl) group but, for convenience, it is used in the present specification and appended claims for the introduction of a chlorinated unsaturated hydrocarbon moiety.

A further object of this invention is to provide a process for the alkylation of an aromatic compound with branched-chain chloroalkene whereby an alkylated product is obtained in which the substituent is straight-chained in nature.

In one aspect an embodiment of this invention resides in a process for the alkylation of an aromatic compound which comprises reacting an aromatic compound with an alkylating agent possessing the generic formula:

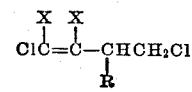

in which X is independently selected from the group consisting of chlorine and hydrogen, and R is a straight-chain alkyl containing from 1 to about 16 carbon atoms, in the presence of a Friedel-Crafts catalyst at alkylation conditions, and recovering the resultant alkylated aromatic compound.

A specific embodiment of this invention is found in a process for the alkylation of an aromatic compound which comprises reacting benzene with 1,1,4-trichloro-3-methyl-1-butene in the presence of aluminum chloride at a temperature in the range of from about −10° to about 150° C. and a pressure in the range of from atmospheric to about 100 atmospheres, and recovering the resultant mixture of 1,1-dichloro-3-phenyl-1-pentene and 1,1-dichloro-4-phenyl-1-pentene.

Other objects and embodiments will be found in the following further detailed description of the present invention.

As hereinbefore set forth, the present invention is concerned with a process for alkylating aromatic compounds, and particularly aromatic hydrocarbons, whereby the resultant product which is obtained from the alkylation reaction will possess alkyl substituents containing only primary and secondary carbon atoms in the chain rather than any chains which possess tertiary or quaternary carbon atoms. By effecting the alkylation reaction utilizing a certain type of alkylating agent which is hereinafter set forth in greater detail, it is possible to obtain products, the formation of which involves alkyl migration, said migration resulting in the obtention of the aforesaid alkylated aromatic compounds containing only primary and secondary carbon atoms in the alkyl chain. Examples of aromatic compounds, and particularly aromatic hydrocarbons, which may be utilized as starting materials in the process of the present invention are those which possess a replaceable hydrogen atom and will include benzene, toluene, the xylenes, particularly ortho- and meta-xylene, hemimellitine, pseudocumene, mesitylene, prehnitol, isodurene, durene, ethylbenzene, o-diethylbenzene, m-diethylbenzene, n-propylbenzene, o-di-n-propylbenzene, m-di-n-propylbenzene, isopropylbenzene (cumene), the isomeric diisopropylbenzenes, butylbenzene, the isomeric dibutylbenzenes, naphthalene, 1-methylnaphthalene, 2-methylnaphthalene, 1-ethylnaphthalene, 2-ethylnaphthalene, 1-n-propylnaphthalene, 2-n-propylnaphthalene, 1,2-di-methylnaphthalene, 1,2 - diethylnaphthalene, 1,2-di-n-propylnaphthalene, 1,2,4-trimethylnaphthalene, anthracene, phenanthrene, chrysene, pyrene, the monoalkyl and polyalkyl-substituted anthracenes, phenanthrenes, chrysenes, pyrenes. It is to be understood that the aforementioned aromatic hydrocarbons are only representative of the class of compounds which may be used and that the present invention is not necessarily limited thereto.

Suitable chlorine substituted olefinic compounds which may be used as alkylating agents in the process of this invention will include those compounds having the following formula:

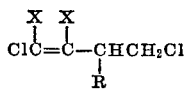

in which X is independently selected from the group consisting of chlorine or hydrogen, and R is a straight-chain alkyl containing from 1 to about 16 carbon atoms. These compounds may be prepared by the peroxide-induced condensation of 1-alkene with a polychloroethylene containing at least one chlorine atom on each of the two doubly-bonded carbon atoms. Some representative examples of these alkylating agents which may be used will include 1,4-dichloro-3-methyl-1-butene,
1,1,4-trichloro-3-methyl-1-butene,
1,1,2,4-tetrachloro-3-methyl-1-butene,
1,4-dichloro-3-ethyl-1-butene,
1,1,4-trichloro-3-ethyl-1-butene,
1,1,2,4-tetrachloro-3-ethyl-1-butene,
1,4-dichloro-3-propyl-1-butene,
1,1,4-trichloro-3-propyl-1-butene,
1,1,2,4-tetrachloro-3-propyl-1-butene,
1,4-dichloro-3-butyl-1-butene,
1,1,4-trichloro-3-butyl-1-butene,
1,1,2,4-tetrachloro-3-butyl-1-butene,
1,4-dichloro-3-pentyl-1-butene,
1,1,4-trichloro-3-pentyl-1-butene,
1,1,2,4-tetrachloro-3-pentyl-1-butene,
1,4-dichloro-3-hexyl-1-butene,
1,1,4-trichloro-3-hexyl-1-butene,
1,1,2,4-tetrachloro-3-hexyl-1-butene,
1,4-dichloro-3-heptyl-1-butene,
1,1,4-trichloro-3-heptyl-1-butene,
1,1,2,4-tetrachloro-3-heptyl-1-butene,
1,4-dichloro-3-octyl-1-butene,
1,1,4-trichloro-3-octyl-1-butene,
1,1,2,4-tetrachloro-3-octyl-1-butene,
1,4-dichloro-3-nonyl-1-butene,
1,1,4-trichloro-3-nonyl-1-butene,
1,1,2,4-tetrachloro-3-nonyl-1-butene,
1,4-dichloro-3-decyl-1-butene,
1,1,4-trichloro-3-decyl-1-butene,
1,1,2,4-tetrachloro-3-decyl-1-butene, the corresponding dichloro-, trichloro- and tetrachloro-1-butenes containing an undecyl-, dodecyl-, tridecyl-, tetradecyl-, pentadecyl- or hexadecyl-substituent on the number 3 carbon atom in the butene chain.

The alkylation reaction of the present process is effected in the presence of a Friedel-Crafts metal halide catalyst. Examples of Friedel-Crafts metal halides will include the active metal halides such as aluminum chloride, ferric chloride, zirconium chloride and the weak metal halides such as zinc chloride. In addition, it is also contemplated within the scope of this invention that boron trifluoride, although a metalloid halide, is to be considered as a Friedel-Crafts catalyst within the meaning of the term "Friedel-Crafts metal halide catalyst." The alkylation conditions under which the process of this invention is effected will include a temperature in the range of from about −10° up to about 150° C. or more and a pressure in the range of from about atmospheric to about 100 atmospheres. The particular reaction temperature which is selected for the reaction will be dependent upon the reactants undergoing alkylation as well as the particular Friedel-Crafts metal halide catalyst which is used. For example, when using an active Friedel-Crafts metal halide catalyst such as aluminum chloride or ferric chloride, the reaction will be effected at a temperature in the lower portion of the range hereinbefore set forth, that is, a temperature of from about −10° up to ambient (about 20°–25° C.) or somewhat higher (below about 75° C.). Conversely speaking, when a relatively weak Friedel-Crafts metal halide catalyst such as zinc chloride is used, it will be necessary to effect the alkylation reaction of the present process at a temperature in the upper portion of the range hereinbefore set forth, that is, from about 100° to about 150° C. or more. In the preferred embodiment of the invention, the alkylation reaction is effected at atmospheric pressure, although as hereinbefore set forth superatmospheric pressures ranging up to 100 atmospheres may be employed. The superatmospheric pressure, if one is to be employed, is afforded by the introduction of a substantially inert gas such as nitrogen into the reaction zone, the amount of pressure employed being that which is necessary to maintain a major portion of the reactants in a liquid phase. It is also contemplated within the scope of this invention that, in addition to the aforementioned reaction conditions of temperature and pressure, the reaction may be effected in an organic solvent medium, said solvents including nitroparaffinic solvents such as nitromethane, nitroethane, nitropropane, etc. or any other organic solvent which is substantially inert in nature.

The process of the present invention in which an aromatic compound is reacted with an alkylating agent of the type hereinbefore set forth in greater detail in the presence of a Friedel-Crafts metal halide catalyst may be effected in any suitable manner and may comprise either a batch or continuous type operation. For example, when a batch type operation is used, a quantity of the aromatic compound such as benzene, the Friedel-Crafts metal halide catalyst and, if so desired, a solvent such as a nitroparaffinic compound are placed in an appropriate apparatus to which the alkylating agent is gradually added. If the reaction is to be effected at atmospheric pressure the apparatus which is utilized to effect the reaction may comprise an alkylation flask which is provided with heating or cooling means and reflux means. If the Friedel-Crafts metal halide catalyst which is employed comprises an active catalyst such as aluminum chloride the reaction may be effected at subambient temperatures, these subambient temperatures being attained by the use of cooling means such as a wet or Dry-Ice bath. Conversely, if a relatively weak Friedel-Crafts metal halide catalyst such as zinc chloride is used it may be advisable to effect the reaction at elevated temperatures, these elevated temperatures also being attained by the utilization of the appropriate heating means. In the event that the reaction is to be effected at superatmospheric temperatures the reaction vessel will comprise an autoclave of the rotating or mixing type. In this instance the starting materials comprising the aromatic compound, the alkylating agent, the catalyst and solvent are placed in the glass liner of a rotating autoclave which is thereafter sealed into the autoclave. The desired operating pressure is reached by the introduction of a substantially inert gas such as nitrogen into the autoclave and the apparatus is thereafter heated to a predetermined operating temperature. After maintaining the apparatus and contents thereof at the desired operating conditions of temperature and pressure for a predetermined residence time which may range from 0.5 up to 10 or more hours in duration, heating is discontinued and the autoclave is allowed to return to room temperature. The excess pressure is discharged, the autoclave is opened and the reaction mixture is recovered therefrom. The reaction mixture is then subjected to a conventional means of separation and purification which may include filtration, washing, drying, extraction, fractional distillation, etc., whereby the desired alkylated aromatic compound is separated from any unreacted starting materials and/or undesired side reaction products which may have formed and is recovered.

It is also contemplated within the scope of this invention that the process for the alkylation of an aromatic compound may be effected in a continuous manner in the operation. When this type of operation is used, the aromatic compound and the alkylation agent are continuously charged to a reaction zone containing the Friedel-Crafts metal halide catalyst, said zone being maintained at the proper operating conditions of the temperature and pressure. The starting materials comprising the aromatic compound and the polychloro-substituted alkene may be charged to the reaction zone through separate lines, or if so desired, they may be admixed prior to entry into said reaction zone and charged thereto in the single stream. Likewise, if a solvent such as a nitroparaffin is to be employed it may be charged to the reaction zone through a separate line or admixed with one or both of the starting materials prior to entry into said reaction zone. After contact with the Friedel-Crafts metal halide catalyst for the desired residence time the reactor effluent is continuously withdrawn from the reaction zone and subjected to separation means similar to those hereinbefore set forth whereby the desired alkylated aromatic compound may be separated from any unreacted starting materials and solvent, the alkylaromatic compound being recovered and removed to storage while the unreacted starting materials and solvent are recycled to the reaction zone to form a portion of the feed stock.

Examples of alkyl-substituted aromatic compounds in which the product contains only primary and secondary carbon atoms in the alkyl side chain which may be produced according to this invention will include such compounds as 1-chloro-3-phenyl-1-pentene,
1,1-dichloro-3-phenyl-1-pentene,
1,1,2-trichloro-3-phenyl-1-pentene,
1-chloro-4-phenyl-1-pentene,
1,1-dichloro-4-phenyl-1-pentene,
1-chloro-3-phenyl-1-hexene,
1-chloro-4-phenyl-1-hexene,
1,1-dichloro-3-phenyl-1-hexene,
1,1-dichloro-4-phenyl-1-hexene,
1-chloro-3-phenyl-1-decene,
1-chloro-4-phenyl-1-decene,
1,1-dichloro-3-phenyl-1-decene,
1,1-dichloro-3-phenyl-1-decene,
1-chloro-3-(m-tolyl)-1-dodecene,
1-chloro-4-(p-tolyl)-1-dodecene,
1,1-dichloro-3-(m-tolyl)-1-dodecene,
1-chloro-3-(xylyl)1-pentene,
1-chloro-4-(xylyl)-1-pentene,
1,1-dichloro-3-(xylyl)-1-pentene,
1,1-dichloro-4-(xylyl)-1-pentene, etc.

It is to be understood that the aforementioned alkyl-substituted aromatic compounds containing only primary and secondary carbon atoms in the alkyl side chain are only representative of the class of compounds which may be prepared and that the present invention is not necessarily limited thereto.

The following examples are given to illustrate the process of the present invention which, however, are not intended to limit the generally broad scope of the present invention in strict accordance therewith.

EXAMPLE I

To the glass liner of a rotating autoclave was charged 150 g. (1.14 mole) of trichloroethylene and 8 g. of di-t-butyl peroxide. The autoclave was sealed and 50 g. (1.2 mole) of propylene was charged thereto along with a sufficient amount of carbon monoxide so that an initial operating pressure of 75 atmospheres was reached. The autoclave was then heated to a temperature of 130° C. and maintained in a range of from 130° to 140° C. for a period of 4 hours, the maximum pressure at this temperature reaching 105 atmospheres. At the end of the 4-hour period, heating was discontinued and the autoclave was allowed to return to room temperature, the final pressure at room temperature being 66 atmospheres. The excess pressure was discharged, the autoclave was opened and the reaction mixture was recovered therefrom. The desired product comprising 1,1,4-trichloro-3-methyl-1-butene was recovered from the mixture by fractional distillation.

To a glass alkylation flask equipped with a dropping funnel, magnetic stirring bar and water-cooled condenser was added 50 g. of benzene and 2 g. of aluminum chloride. The benzene and aluminum chloride mixture was stirred while 8 g. of 1,1,4-trichloro-3-methyl-1-butene which had been prepared according to the above paragraph was gradually added during a period of 40 minutes. Upon completion of the addition of the trichloromethylbutene, the mixture was stirred for an additional period of 45 minutes. At the end of this time, the product was treated with ice water and the organic phase was separated and distilled. The bottoms which remained after distilling off most of the benzene were subjected to preparative gas-liquid chromatographic analysis followed by microanalysis, nuclear magnetic resonance and infrared. The preparative gas-liquid chromatographic analysis showed the presence of two major peaks A and B. The nuclear magnetic resonance spectrum of Peak A showed the presence of an ethyl group bonded to a benzylic methine and a dichlorovinyl group bonded to a benzylic methine. The nuclear magnetic resonance evidence thus showed that the product was 1,1-dichloro-3-phenyl-1-pentene. A carbon/hydrogen analysis of the peak was performed with the following results.

Calculated for $C_6H_5C_5H_7Cl_2$: C, 61.42%; H, 5.62%. Found: C, 61.85%; H, 5.71%.

In addition, the infrared spectrum supported the structure which was suggested by the nuclear magnetic resonance analysis. Bands which are due to mono substitution were found at 705 and 7.67 cm.$^{-1}$ and between 1700 and 2000 cm.$^{-1}$. A strong C=C band was found at 1620 cm.$^{-1}$ and bands at 855 cm.$^{-1}$ and 900 cm.$^{-1}$ are due to

and =CCl$_2$ respectively.

The nuclear magnetic resonance spectrum of Peak B disclosed the presence of a methylene group bonded to a vinyl group and one methyl group bonded to a benzylic methine. This evidence disclosed that the product was 1,1-dichloro-4-phenyl-1-pentene. In addition, the infrared spectrum of this second peak was quite similar to that which was described for the first peak. Aromatic bands (mono substitution) were found at identical frequencies. The C=C band was found at 1625 cm.$^{-1}$, the

was found at about 850 cm.$^{-1}$ and the =CCl$_2$ was now found at 865 cm.$^{-1}$. The infrared spectrum thus fit the structure which was proposed by the nuclear magnetic resonance spectrum for the 1,1-dichloro-4-phenyl-1-pentene compound accountable for this peak in the preparative gas-liquid chromatographic analysis. A carbon/ hydrogen analysis of this peak was performed with the following results:

Found: C, 61.57%; H, 5.67%.

EXAMPLE II

In this example 50 g. of benzene, along with 2 g. of aluminum chloride and 5 g. of nitromethane are placed in an alkylation flask which is provided with a dropping funnel, magnetic stirring bar and a water-cooled condenser. Following this, 10 g. of 1,1,4-trichloro-3-hexyl-1-butene which is prepared by the t-butyl peroxide-induced condensation of trichloroethylene and 1-octene is slowly added to the flask during a period of approximately 1 hour. At the end of this 1-hour addition period, the resulting mixture is continuously stirred for an additional 1-hour period, after which the product is treated with ice water and the organic phase is separated from the aqueous phase. The organic phase is subjected to distillation to remove the benzene and nitromethane, following which the residue is submitted to a preparative gas-liquid chromatographic analysis. This analysis will disclose the presence of the desired product comprising a mixture of 1,1-dichloro-3-phenyl-1-decene and 1,1-dichloro-4-phenyl-1-decene.

EXAMPLE III

To a glass alkylation flask provided with a dropping funnel, magnetic stirring bar and water-cooled condenser is added 60 g. of toluene, 2 g. of zirconium chloride and 5 g. of nitromethane. Following this, 10 g. of 1,1,4-trichloro-3-octyl-1-butene which is prepared by condensing trichloroethylene with 1-decene in the presence of di-t-butyl peroxide at a temperature at least as high as the decomposition temperature of said di-t-butyl peroxide is slowly added during a period of 1 hour. The flask is then heated to reflux and maintained thereat for an additional period of 1 hour while stirring the mixture. At the end of this time, heating is discontinued, the reactor is allowed to return to room temperature and ice water is added to the mixture. The organic layer is separated from the aqueous layer, washed, dried and distilled to remove unreacted benzene and nitromethane. The residue from this distillation is analyzed by means of a preparative gas-liquid chromatographic analysis, said analysis disclosing the presence of a mixture of 1,1-dichloro-3-(m-tolyl)-1-dodecene and 1,1-dichloro-4-(m-tolyl)-1-dodecene, containing some of the p-tolyl analogs.

EXAMPLE IV

In this example 50 g. of benzene, 2 g. of aluminum chloride and 5 g. of nitromethane are placed in a glass alkylation flask similar to those hereinbefore described. To the flask is slowly added 8 g. of 1,4-dichloro-3-methyl-1-butene which is prepared by the peroxide-induced condensation of 1,2-dichloroethylene and propylene. After the addition of the dichloromethylbutene which takes place during a period of 45 minutes, with constant stirring, the resulting mixture is stirred for an additional period of 45 minutes, the addition and the stirring period being effected at ambient temperature. Ice water is added to the mixture. The aqueous layer is separated from the organic layer following which the latter is washed, dried and subjected to preparative gas-liquid chromatographic analysis, nuclear magnetic resonance analysis and infrared analysis. These analyses will disclose the presence of a mixture of 1-chloro-3-phenyl-1-pentene and 1-chloro-4-phenyl-1-pentene.

EXAMPLE V

In this example a mixture consisting of 60 g. of m-xylene, 2 g. of zirconium chloride and 5 g. of nitromethane is placed in a glass alkylation flask provided with a dropping funnel, magnetic stirring bar and water-cooled condenser. To the flask is slowly added 8 g. of 1,1,4-trichloro-3-methyl-1-butene which is prepared in a manner similar to that set forth in Example I above, the addition taking place during a period of 45 minutes accompanied by a continual stirring of the mixture. Thereafter the flask is heated to reflux and maintained thereat for an additional period of 1 hour, the reaction mixture again being continuously stirred during this period. At the end of the aforesaid 1-hour period, heating is discontinued, the flask is allowed to return to room temperature, and ice water is then added. The organic phase is separated from the aqueous phase, washed, dried and subjected to distillation to remove unreacted xylene and nitromethane. The residue is analyzed in a manner similar to that hereinbefore set forth, the analyses showing that the product comprises a mixture of 1,1-dichloro-3-(3,5-dimethylphenyl) - 1 - pentene and 1,1-dichloro-4-(3,5-dimethylphenyl)-1-pentene.

I claim as my invention:

1. A process for the alkylation of an aromatic hydrocarbon which comprises reacting said aromatic hydrocarbon with an alkylating agent possessing the generic formula:

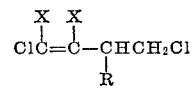

in which X is independently selected from the group consisting of chlorine and hydrogen, and R is a straight-chain alkyl containing from 1 to about 16 carbon atoms in the presence of a Friedel-Crafts catalyst at a temperature in the range of from about −10° to about 150° C. and a pressure in the range of from about, atmospheric to about 100 atmospheres, and recovering the resultant alkylated aromatic hydrocarbon.

2. The process as set forth in claim 1 further characterized in that said process is effected in a solvent medium comprising nitromethane.

3. The process as set forth in claim 1 in which said Friedel-Crafts catalyst is aluminum chloride.

4. The process as set forth in claim 1 in which said Friedel-Crafts catalyst is zirconium chloride.

5. The process as set forth in claim 1 in which said aromatic hydrocarbon is benzene, said alkylating agent is, 1,4-dichloro-3-methyl-1-butene and said alkylated aromatic hydrocarbon is a mixture of 1,1-dichloro-3-phenyl-1-pentene and 1,1-dichloro-4-phenyl-1-pentene.

6. The process as set forth in claim 1 in which said aromatic hydrocarbon is benzene, said alkylating agent is 1,1,4-trichloro-3-hexyl-1-butene, and said alkylated aromatic hydrocarbon is a mixture of 1,1-dichloro-3-phenyl-1-decene and 1,1-dichloro-4-phenyl-1-decene.

7. The process as set forth in claim 1 in which said aromatic hydrocarbon is toluene, said alkylating agent is 1,1,4-trichloro-3-octyl-1-butene and said alkylated aromatic hydrocarbon is a mixture of 1,1-dichloro-3-(m-tolyl)-1-dodecene and 1,1-dichloro-4-(m-tolyl)-1-dodecene.

8. The process as set forth in claim 1 in which said aromatic hydrocarbon is benzene, said alkylating agent is 1,4-dichloro-3-methyl-1-butene and said alkylated aromatic hydrocarbon is a mixture of 1-chloro-3-phenyl-1-pentene and 1-chloro-4-phenyl-1-pentene.

9. The process as set forth in claim 1 in which said aromatic hydrocarbon is m-xylene, said alkylating agent is 1,1,4-trichloro-3-methyl-1-butene and said alkylated aromatic hydrocarbon is a mixture of 1,1-dichloro-3-(3,5-dimethylphenyl)-1-pentene and 1,1-dichloro-4-(3,5-dimethylphenyl)-1-pentene.

References Cited

UNITED STATES PATENTS 2,485,017   10/1949   Schmerling _____ 260—650 R
2,745,884   5/1956   Kundiger et al _____ 260—650 R HOWARD T. MARS, Primary Examiner U.C. Cl. X.R.

260—649 R